UNITED STATES PATENT OFFICE.

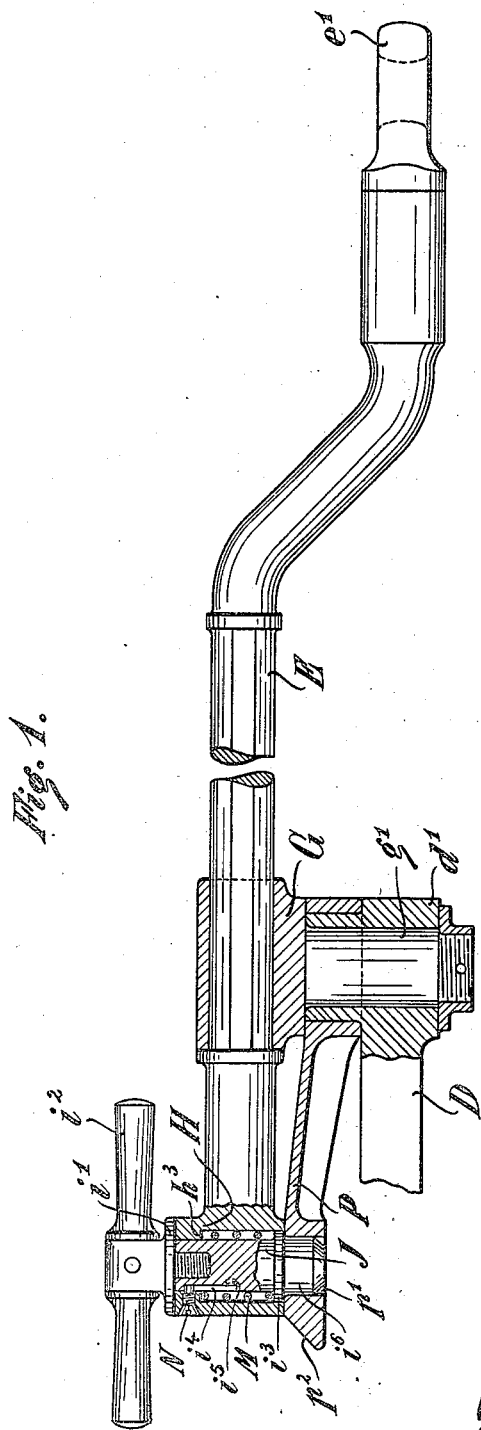

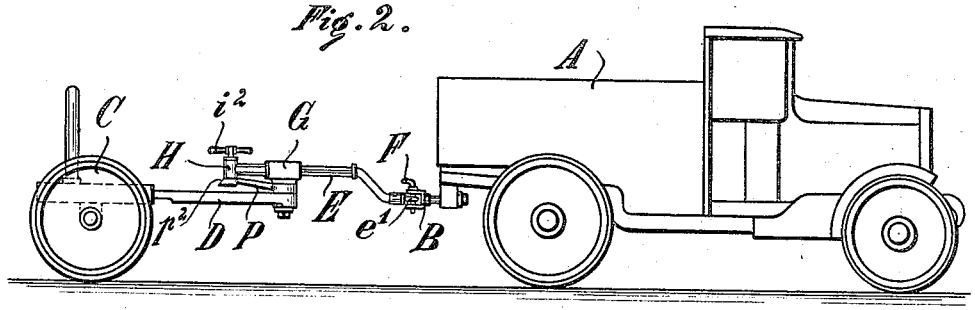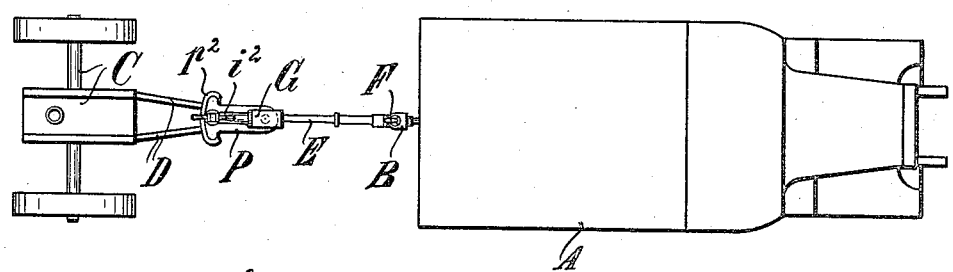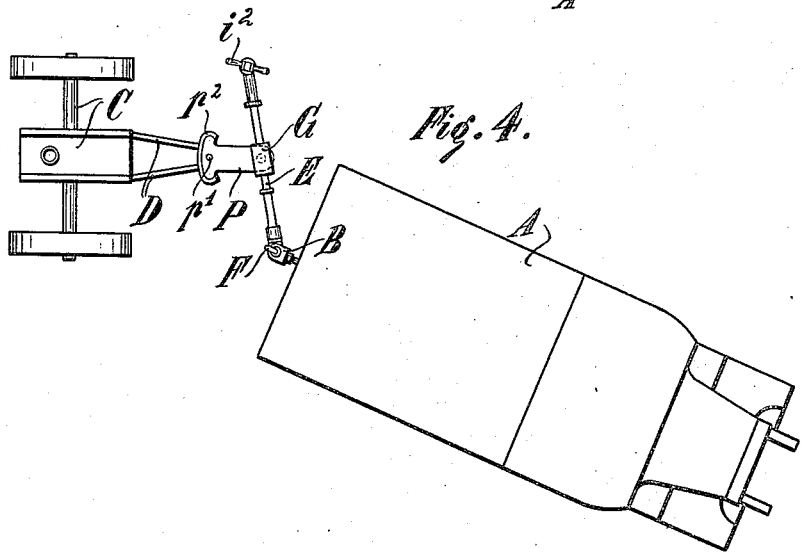

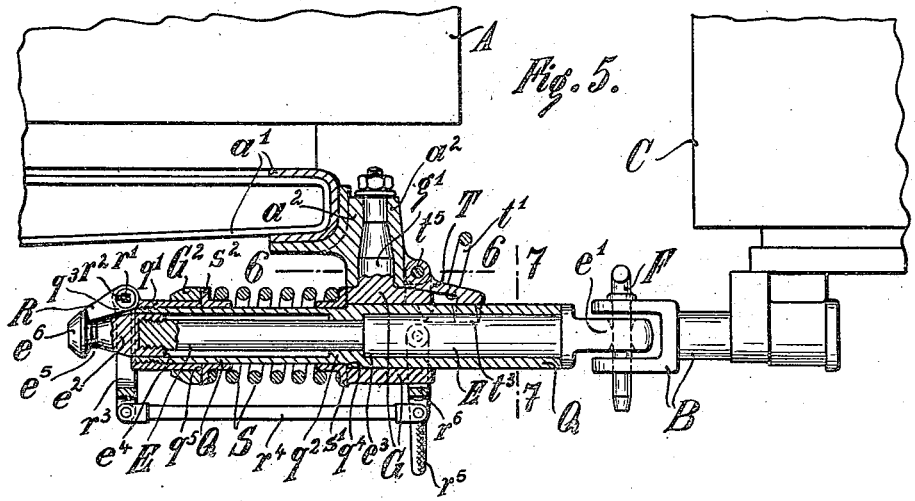
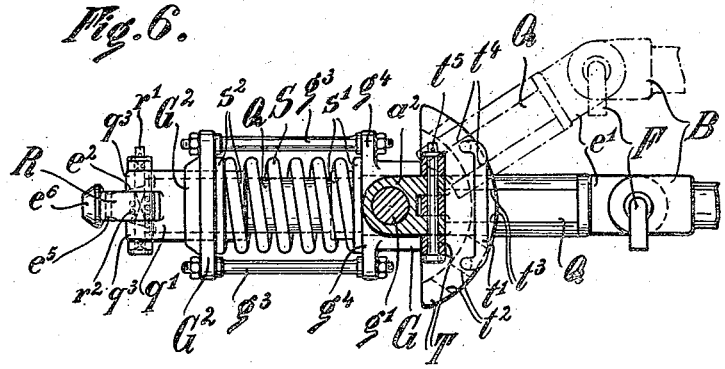
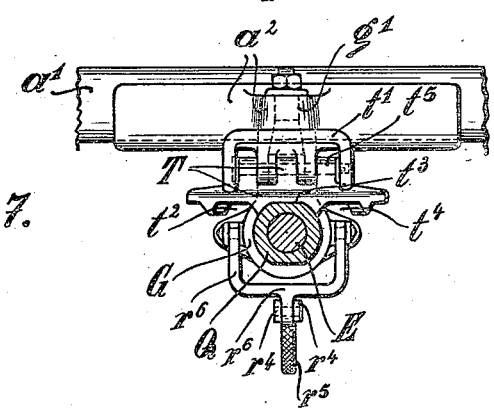

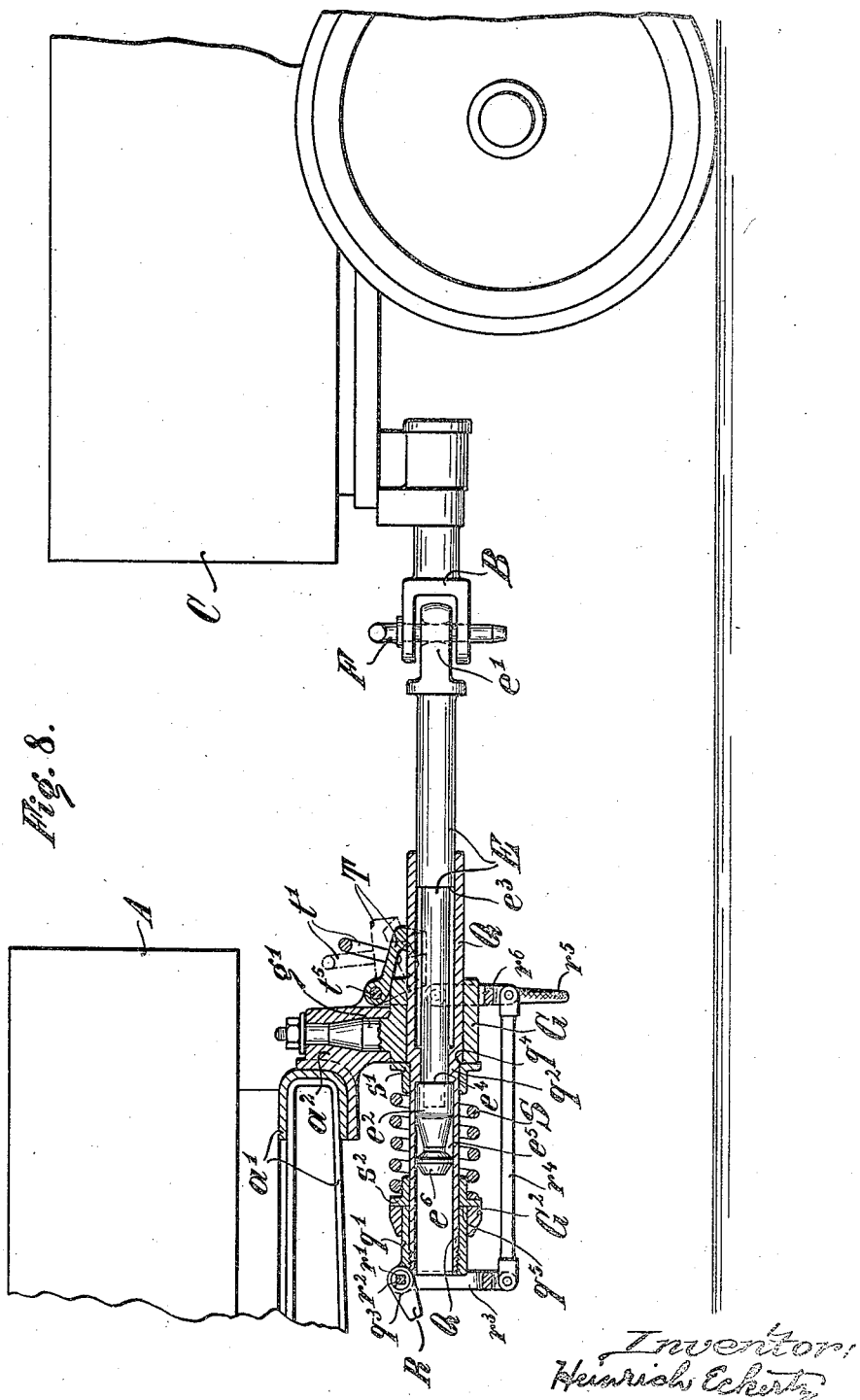

HEINRICH ECKERTZ, OF ESSEN-RELLINGHAUSEN, GERMANY, ASSIGNOR TO FRIED. KRUPP AKTIENGESELLSCHAFT, OF ESSEN-ON-THE-RUHR, GERMANY.

COUPLING MEMBER FOR VEHICLES.

1,422,189.

Specification of Letters Patent.  Patented July 11, 1922.

Application filed September 7, 1920. Serial No. 408,747.

*To all whom it may concern:*

Be it known that I, HEINRICH ECKERTZ, residing at Essen-Rellinghausen, Germany, a citizen of the German Republic, have invented a certain new and useful Improvement in Coupling Members for Vehicles, of which the following is a specification.

This invention relates to that class of coupling members for vehicles which have a coupling rod which can be rocked about a vertical axis. The object of the invention is to so improve couplings of this kind, that with the most compact construction possible and simplicity of manipulation, the range within which the vehicles can be quickly and easily coupled to each other is as great as possible. This object is attained according to the invention by the fact that the coupling rod can be moved longitudinally in a guide arranged on the vehicle and can be rocked about a vertical axis relatively to the vehicle which carries the aforesaid guide.

The invention will be further described with reference to the accompanying drawings in which—

Figure 1 is a longitudinal section of a construction of the arrangement, partially in side elevation, Figure 2 shows diagrammatically a side elevation of a limber in the travelling position coupled to a motor vehicle, Figure 3 is the top plan view corresponding to Figure 2 and Figure 4 is a top plan view of the two vehicles in a position which they assume when being coupled together.

Figure 5 is a longitudinal section of a second construction of the arrangement and showing a side elevation of those parts of the coupled vehicles affected by the invention, Figure 6 is a top plan view corresponding to Figure 5 partially in section on the line 6—6 of Figure 5.

Figure 7 is a section on the line 7—7 of Figure 5, looking from the right and

Figure 8 is a view corresponding to Figure 5 with certain parts in different positions.

The arrangement shown in Figures 1 to 4 will be described first.

On the rear end of the motor vehicle A (see Figures 2 to 4) is arranged a coupling fork B, between the arms of which fork for the purpose of coupling up the limber there can be introduced a coupling eye $e^1$ connected to the limber arms D of the limber (see Figures 1 and 2) and for the coupling thereof to the fork B a bolt F is provided (see Figures 2 to 4). The eye $e^1$ is mounted on a coupling rod E (see particularly Figure 1), which is adapted to move longitudinally in a sleeve G but cannot rotate, and the sleeve G has a vertical pin $g^1$ (see Figure 1) which fits into a bearing $d^1$ provided on the limber arms D. On the end of the rod E opposite to the eye $e^1$ and which projects beyond the sleeve G is mounted a casing H for a locking bolt J. On the upper end of this bolt J is mounted an abutment $i^1$, which carries a handle $i^2$. Inside the casing H is a helical spring M coiled round the bolt J (see Figure 1) and which bears with one end against a shoulder $h^3$ on the wall of the casing and with its other end against a collar $i^3$ on the bolt J. This spring M tends to draw the bolt J so far into the casing H that the abutment $i^1$ rests upon the casing. The bolt J is provided with a groove $i^4$ $i^5$ which is composed of a part $i^4$ lying in the longitudinal direction of this bolt and of a part $i^5$ which joins onto the lower end of the part $i^4$ and runs at right angles to the part $i^4$, and a screw-threaded pin-screw N screwed into the casing H engages in the groove $i^4$ $i^5$.

The part $i^6$ of the locking bolt J, which lies underneath the collar $i^3$ and is of truncated cone shape at its lower end, is adapted to enter a circular opening in an arm P under the action of a spring M. The arm P is non-rotatably connected to the bearing $d^1$ provided on the limber arms D and has a sloping face $p^2$ for the bolt $i^6$ to ride up on.

When the eye $e^1$ is to be coupled to the fork B the locking bolt J is lifted by means of the handle $i^2$ until the lower end of the part $i^4$ of the groove lies opposite the screw N, and then by rotating the locking bolt J the screw is caused to enter the part $i^5$ of the groove, so that the spring M cannot draw the locking bolt J back into the casing H. When the locking bolt J is in this position, in which its part $i^6$ is out of engagement with the circular opening $p^1$ in the arm P, the rigid connection of the coupling rod E with the limber arms D is broken and the rod E can be pushed into the sleeve G and at the same time rocked together with it about the axis of the pin $g^1$. In consequence thereof the eye $e^1$ can then be quickly and without any trouble introduced into the fork B and be coupled thereto by the bolt F, when the vehicles are not in that relative position, which they would have to be in, in order to couple them up, were the coupling rod E rigidly connected to the limber arms D. Thus Figure 4 shows that by pushing back and rocking the rod E it is possible to couple the vehicles together when the limber C is too near to the motor vehicle A and situated obliquely thereto.

After the coupling bolt F has been introduced into the fork B and the eye $e^1$ and the vehicles so coupled together, the locking bolt J is rotated backwards for such a distance that the pin screw N again enters the part $i^4$ of the groove, the spring M so pushing the locking bolt J down into the casing. When the motor vehicle begins to pull the rod E, which is situated at an angle to the longitudinal axis of the limber (see Figure 4), is brought by rocking it about the axis of the pin $g^1$ into the longitudinal direction of the limber and drawn forwards in the sleeve G. Towards the end of this movement the part $i^6$ of the locking bolt J strikes against the face $p^2$ of the arm P. By the co-operation of the face $p^2$ with the cut off end of the part $i^6$ of the bolt, the locking bolt J is raised against the pressure of the spring M and finally shoots into the circular opening $p^1$ in the arm P. In this position of the parts the coupling rod E is rigidly connected to the limber arms D.

An important advantage of the arrangement described consists in the fact that by means of a single catch mechanism (H, J, $p^1$, P) the coupling rod E is prevented from making any longitudinal movement in the sleeve G and also from rotating about the axis of the pin $g^1$.

In the arrangement shown in Figures 5 to 8 the coupling rod when in the travelling position is under the action of a spring the action of which on the coupling rod can be made eliminated when the coupling is to be made or disconnected. The frame $a^1$ of the motor vehicle A carries in this case on its rear end a bearing $a^2$ rigidly connected thereto for the vertical pin $g^1$ of the guide G. In a horizontal through aperture in the guide G is carried a sleeve Q which is adapted to slide longitudinally but cannot rotate. On the front end of the sleeve Q is screwed a sleeve $q^1$ (Figures 5, 6 and 8) which engages in a through aperture in a cross piece $G^2$. The cross piece $G^2$ is rigidly connected by bolts $g^3$ (see Figure 6) to two lugs $g^4$ mounted on the guide G. In the sleeve Q slides a coupling rod E, which has a reduced diameter for a portion of its length and is provided on its rear end, where it projects from the sleeve, with a coupling eye $e^1$. On the front end of the rod E is screwed a head piece $e^2$ (see particularly Figures 5 and 8).

An annular shaped projection $q^2$ which projects into the through aperture in the sleeve Q (see Figures 5 and 8) and which is mounted on the wall of the sleeve forms a stop for the shoulder $e^3$ on the rod E and for the end face $e^4$ of the head piece $e^2$, and which head piece $e^2$ has an annularly shaped recess $e^5$ and a head $e^6$. The recess $e^5$ is intended to act as a ratchet for a pawl R non-rotatably connected to a bolt $r^1$ (see Figures 5, 6 and 8), which bolt $r^1$ is rotatably mounted on both sides of the pawl R in eye $q^3$ on the sleeve $q^1$. A spring $r^2$, which engages with the sleeve $q^1$ and the pawl R tends to hold the latter in that position in which it is able, to engage in the recess $e^5$. To the bolt $r^1$ are also non-rotatably connected the two arms of a fork $r^3$ which is connected by a connecting rod $r^4$ located under the sleeve Q (see particularly Figures 5 and 8) to the handle $r^5$ of a second fork $r^6$ pivoted to the guide G (see particularly Figure 7). Around the sleeve Q is coiled an initially stressed spring S, the abutments for which are formed by two flanged rings $s^1$ $s^2$ movable longitudinally on the sleeve. The ring $s^1$ bears against the guide G and also engages the shoulder $q^4$ on the sleeve Q, while the ring $s^2$ bears against the cross piece $G^2$ and the rear end face $q^5$ of the sleeve $q^1$ when the shaft E is not under draft.

On the bearing $a^2$ of the pivot pin $g^1$ is mounted by means of a bolt $t^5$ a trap T provided with a stirrup-shaped handle $t^1$. The trap T, which has three slots $t^2$, $t^3$, $t^4$ in it for engagement with the sleeve Q (see Figures 6 and 7), is for the purpose of securing the sleeve Q and with it the coupling rod E in definite angular positions relatively to the motor vehicle, such positions being in the direction of the longitudinal axis of the motor vehicle (engagement of the sleeve Q with the central slot $t^3$ of the trap T) or at the greatest angle of swing deemed permissible for running backwards (engagement of the sleeve Q with one of the slots $t^2$, $t^4$).

If the eye $e^1$ is to be coupled with the fork B arranged on the trailer vehicle C, the pawl R is lifted by the handle $r^5$ out of the slot $e^5$ by means of the connecting rod $r^4$ and the fork $r^3$ against the action of the spring $r^2$. The coupling rod E then lies free in the sleeve Q and can be drawn out backwards, after which the parts R, $r^3$, $r^4$, $r^5$, $r^6$ as soon as the handle $r^5$ is released, swing back under the action of their own weight and of the spring $r^2$ into the position shown in the drawing. After the trap has next been raised by its handle $t^1$ (see the dot and dash position in Figure 8) the coupling rod E together with the sleeve Q and the guide G can be rocked about the axis of the pin $g^1$. In consequence of this movability of the rod E there is no difficulty in introducing the eye $e^1$ into the fork B and coupling the former to the fork by a bolt F.

When the motor vehicle begins to pull, the rod E sets itself by rocking about the axis of the pin $g^1$ in the direction of the longitudinal axis of the motor vehicle and is secured in this position by releasing the hitherto raised trap T so that it catches with its slot $t^2$ located over the sleeve Q. At the same time the rod E is withdrawn rearwards from the sleeve until the stop $e^4$ on the rod E strikes against the stop $q^2$ on the sleeve Q (see Figure 8). The rod is then, when the vehicle is moving in a forward direction, under the action of the spring S, which absorbs the shocks caused by the resistance produced by the effort to move the trailer C. When such a shock takes place, the sleeve Q with the sleeve $q^1$ is pushed to the rear in the through aperture of the cross piece $G^2$ secured on the guide G by the bolts $g^3$, the ring $s^2$ is lifted off the cross piece $G^2$ and the spring S is compressed.

Should the speed of the motor vehicle become reduced for any reason, while the trailer C continues to run on at its original speed owing to acquired momentum, the rod E will be pushed forwards in the sleeve Q, until the projection $e^3$ on the rod E strikes against the stop $q^2$ on the sleeve Q. At the same time the pawl R first moves out of the path of the head $e^6$ of the rod E against the action of the spring $r^2$ and then drops into the slot $e^5$. In this position of the parts, which is clearly shown in Figure 5, the rod E is prevented from moving longitudinally in the sleeve Q in one direction by the pair of stops $e^3$, $q^2$ and in the opposite direction by the catch $e^5$, R. In consequence thereof the rod E can only be moved in conjunction with the sleeve Q in both directions relatively to the guide G. Since, however, the sleeve Q can only be moved in the guide G against the action of the spring S, the rod E is under the action of the spring S, both, when the vehicle moves forwards and backwards, and when shocks take place, when the vehicle moves forwards, the abutment $s^2$ of the spring S can be moved by the action of the stop $q^5$ of the sleeve Q and when shocks take place when the vehicle moves backwards the abutment $s^1$ of the spring S can be moved by the action of the stop $q^4$ on the sleeve Q.

When the shaft E is in the oblique position (shown in dot and dash lines on Fig. 6) the motor vehicle A can nevertheless back the trailer C because the sleeve Q will fall into engagement with one of the slots $t^2$, $t^4$, thus arresting further swinging of the shaft E so that the backing movement of the motor vehicle A will be imparted to the trailer C.

When the coupling B, $e^1$, F is to be disconnected, the pawl R is lifted out of the slot $e^5$ by means of the handle $r^5$ after which the rod E can be withdrawn rearwards out of the sleeve Q even when the coupling is under tension. Even in this case therefore the coupling can be easily disconnected without the vehicle having to be moved.

I claim:—

1. A coupling for vehicles comprising in combination a guide pivotally mounted on a vertical axis, a coupling rod longitudinally movable in the guide, means for locking the rod against longitudinal movement and the rod and guide against angular movement, means for releasing the locking means to permit longitudinal movement of the rod and angular movement of the rod and guide, the locking means becoming operative automatically upon a predetermined movement of the rod relative to said guide.

2. A coupling for vehicles comprising a guide means, a coupling rod longitudinally movable in said guide means, a resilient shock absorbing means between said coupling rod and said guide means, further means for locking said rod to said shock absorbing means and still further means for unlocking said locking means.

3. A coupling for vehicles comprising a guide means, a coupling rod longitudinally movable in said guide means and a resilient shock absorbing means between said coupling rod and said guide means, and further means for automatically locking said coupling rod to said shock absorbing means when the rod moves a predetermined amount in a given direction relative to said shock absorbing means, and still further means for unlocking said locking means.

4. A coupling for vehicles comprising a guide means, a coupling rod longitudinally movable in said guide means and a resilient shock absorbing means between said coupling rod and said guide means, and further means for automatically locking said coupling rod to said shock absorbing means when the rod moves a predetermined amount in a given direction relative to said shock absorbing means.

5. A coupling for vehicles comprising a guide means pivotally mounted on a vertical axis, a coupling rod longitudinally movable in said guide means and a resilient shock absorbing means between said coupling rod and said guide means, and lost motion abutments between said rod and said shock absorbing means.

6. A coupling for vehicles comprising a guide means pivotally mounted on a vertical axis, a coupling rod longitudinally movable in said guide means and a resilient shock absorbing means between said coupling rod and said guide means, and lost motion abutments between said rod and said shock absorbing means, and further means for automatically locking said coupling rod to said shock absorbing means to overcome lost motions when the rod moves a predetermined amount in a given direction relative to one of the abutments of said shock absorbing means.

7. A coupling for vehicles comprising a guide means, a coupling rod longitudinally movable in said guide means and a resilient shock absorbing means between said coupling rod and said guide means, and further means for automatically locking said coupling rod to said shock absorbing means when the rod moves a predetermined amount in a given direction relative to said shock absorbing means, and still further means for locking said guide and its longitudinally disposed rod in a given radial direction relative to said vertical axis.

8. A coupling for vehicles comprising a guide means pivotally mounted on a vertical axis, a coupling rod longitudinally movable in said guide means and a resilient shock absorbing means between said coupling rod and said guide means, and lost motion abutments between said rod and said shock absorbing means, and further means for automatically locking said coupling rod to said shock absorbing means to overcome lost motions when the rod moves a predetermined amount in a given direction relative to one of the abutments of said shock absorbing means, and still further means for locking said guide and its longitudinally disposed rod in a given radial direction relative to said vertical axis.

9. A coupling for vehicles comprising a guide means pivotally mounted on a vertical axis, a coupling rod longitudinally movable in said guide means and a resilient shock absorbing means between said coupling rod and said guide means, and lost motion abutments between said rod and said shock absorbing means, and further means for automatically locking said coupling rod to said shock absorbing means to overcome lost motions when the rod moves a predetermined amount in a given direction relative to one of the abutments of said shock absorbing means, and unlocking means for said automatic locking means.

10. A coupling for vehicles comprising a guide means pivotally mounted in a vertical axis, a coupling rod longitudinally movable in said guide means, lost motion abutments between said rod and guide means, and an automatic locking means between said rod and guide means on a predetermined movement of said rod relative to said guide means.

11. A coupling for vehicles comprising a guide means pivotally mounted on a vertical axis, a coupling rod longitudinally movable in said guide means, lost motion abutments between said rod and guide means, and an automatic locking means between said rod and guide means on a predetermined movement of said rod relative to said guide means, and unlocking means for said automatic locking means.

12. A coupling for vehicles comprising a guide means pivotally mounted on a vertical axis, a coupling rod longitudinally movable in said guide means, lost motion abutments between said rod and guide means, and an automatic locking means between said rod and guide means on a predetermined movement of said rod relative to said guide means, and further means for locking said guide means and its longitudinally disposed rod in a given radial direction relative to said vertical axis.

The foregoing specification signed at Essen, Germany, this 27th day of May, 1920.

HEINRICH ECKERTZ.

In presence of—
HANS GOTTSMANN,
JOSEF OLBERTZ.